(12) United States Patent
Por et al.

(10) Patent No.: US 7,840,733 B2
(45) Date of Patent: Nov. 23, 2010

(54) POWER OPTIMIZED DYNAMIC PORT ASSOCIATION

(75) Inventors: Choon Gun Por, Penang (MY); Soon Seng Seh, Penang (MY)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 12/217,466

(22) Filed: Jul. 3, 2008

(65) Prior Publication Data
US 2010/0005204 A1 Jan. 7, 2010

(51) Int. Cl.
*G06F 13/00* (2006.01)
*G06F 1/32* (2006.01)
*G06F 1/00* (2006.01)

(52) U.S. Cl. .............. 710/104; 710/2; 710/9; 710/302; 710/316; 713/300; 713/320; 713/324; 370/351; 370/389; 370/537

(58) Field of Classification Search .......... 713/320, 713/324; 710/2, 9, 302, 316; 370/351, 389, 370/537
See application file for complete search history.

(56) References Cited

U.S. PATENT DOCUMENTS

| | | | | |
|---|---|---|---|---|
| 6,460,143 | B1 * | 10/2002 | Howard et al. | 713/323 |
| 6,728,801 | B2 * | 4/2004 | Leete et al. | 710/54 |
| 6,732,218 | B2 * | 5/2004 | Overtoom et al. | 710/313 |
| 6,732,219 | B1 * | 5/2004 | Broyles | 710/316 |
| 6,874,055 | B2 * | 3/2005 | Chiang et al. | 710/316 |
| 7,131,035 | B2 * | 10/2006 | Gulick et al. | 714/34 |
| 7,191,256 | B2 * | 3/2007 | Adams et al. | 710/11 |
| 7,383,372 | B2 * | 6/2008 | Tjia et al. | 710/315 |
| 7,415,626 | B2 * | 8/2008 | Lilja et al. | 713/500 |
| 7,552,475 | B2 * | 6/2009 | Piwonka et al. | 726/22 |
| 2007/0233909 | A1 * | 10/2007 | Derr et al. | 710/36 |

OTHER PUBLICATIONS

"Power Management of USB Host Controllers"—11 pages; dated Aug. 30, 2004.*
"Enhanced Host Controller Interface Specification for Universal Serial Bus"—155 pages; dated Mar. 12, 2002.*
"Universal Host Controller Interface (UHCI) Design Guide"—47 pages; dated Mar. 1996.*

* cited by examiner

*Primary Examiner*—Mark Rinehart
*Assistant Examiner*—Brian T Misiura
(74) *Attorney, Agent, or Firm*—Derek J. Reynolds

(57) ABSTRACT

A method, device, system, and computer readable medium are disclosed. In one embodiment the method includes dynamically associating a newly active port in a computer system with a first host controller. The first association happens when a total number of currently active ports in the computer system is less than a maximum capacity number of ports for the first host controller. The method also includes dynamically associating the newly active port in the computer system with a second host controller. The second association happens when the total number of currently active ports in the computer system is greater than or equal to the maximum capacity number of ports for the first host controller. In this method, each port, the first host controller, and second host controller all utilize the same protocol.

21 Claims, 9 Drawing Sheets

POWER OPTIMIZED DYNAMIC PORT ASSOCIATION

FIELD OF THE INVENTION

The invention relates to dynamically associating ports with host controllers.

BACKGROUND OF THE INVENTION

Host controllers are common in computer systems. Many host controllers control an interconnect (i.e. bus) subsystem that operates using a specific protocol. For example, a computer system that utilizes Universal Serial Bus (USB) input/output (I/O) subsystem requires at least one USB host controller. Other protocols utilize their own host controllers, such as Serial Advanced Technology Attachment (SATA), among others. The host controller communicates with compatible devices attached to the host controller. Many times these devices are attached through ports, such as in the case of USB. These ports can include external ports that actual have a physical plug-in interface on the external casing of a computer system and they can also include internal ports for permanent devices such as an integrated webcam in a laptop computer.

For many protocol subsystems, such as USB, there is a maximum number of ports that a given host controller has the capability of controlling. Different versions of the USB implementation allow differing numbers of ports to control. Because of the cap in number of ports for a single host controller, many advanced computer systems today have multiple host controllers for a single protocol. For example, in a USB 1.1 case, a single host controller can control two ports. In a USB 2.0 case, a single host controller can control up to eight ports. If a computer system needs more than 8 USB 2.0 ports, the computer system would require at least two USB 2.0 host controllers to manage the requirement and maintain good bandwidth. Each host controller that is operational in the computer system consumes power. Many advanced computer systems today have the capability to manage the power of a component within the computer system by putting the component into a low power mode.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a method, device, system, and computer readable medium for power optimized dynamic port association are disclosed. Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

Figure 1:
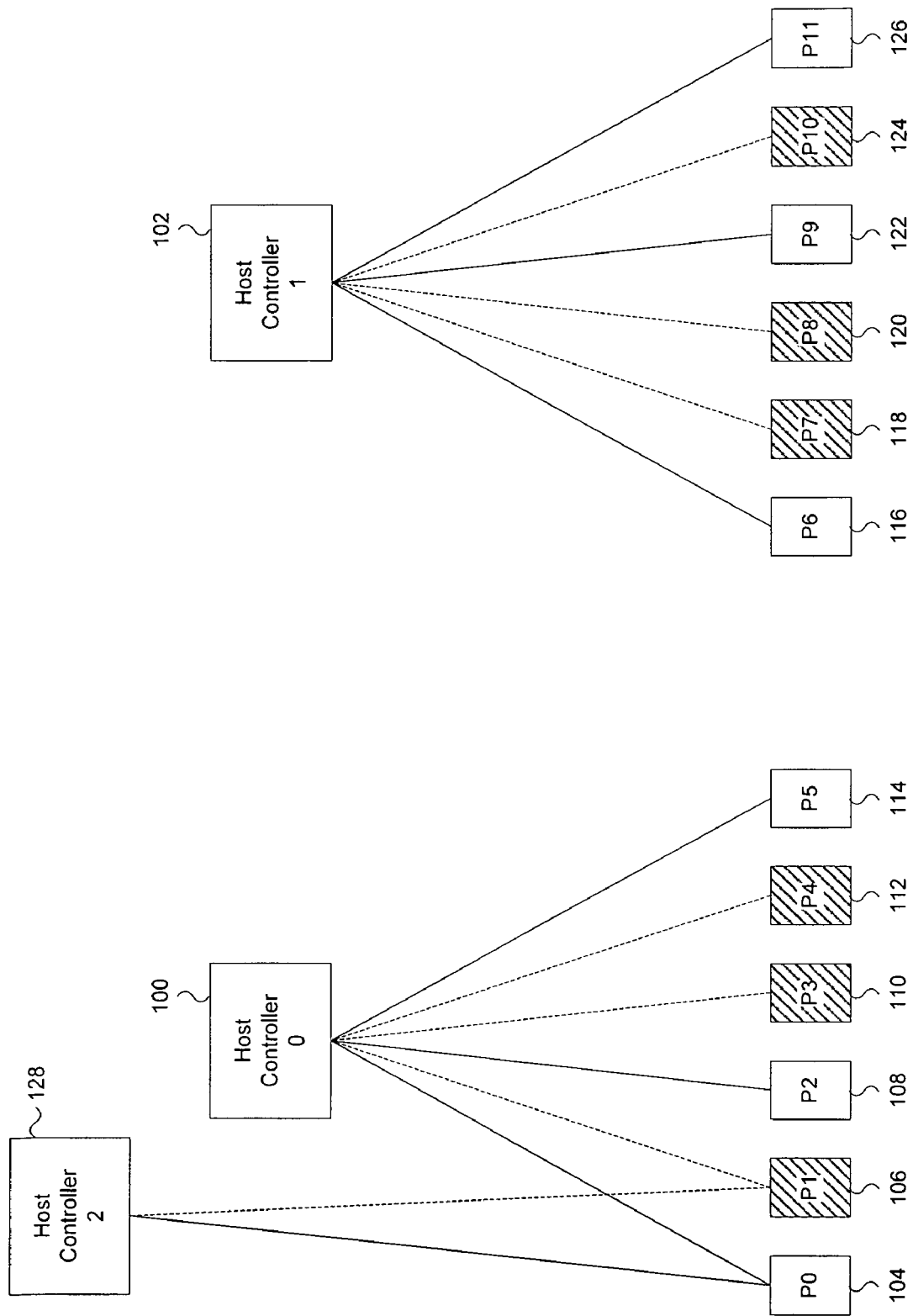
FIG. 1 describes an embodiment of a current computer system with two identical host controllers that control 12 ports in total.

FIG. 1 describes an embodiment of a current computer system with two identical host controllers (host controller 0, item 100, and host controller 1, item 102) that control 12 ports in total. Ports 0-5 (P0-P5, items 104, 106, 108, 110, 112, and 114 respectively) are controlled by host controller 0 and ports 6-11 (P6-P11, items 116, 118, 120, 122, 124, and 126) are controlled by host controller 1. Furthermore, a legacy host controller 2 (item 128) is also shown and shares ports P0 and P1 with host controller 0.

In other embodiments not pictured, there may be any plural number of host controllers, each of which controls any specific number of ports. In FIG. 1, the current computer system shown includes interconnect lines that are hardwired between each host controller and the specific ports permanently associated with the host controller. In many embodiments, a port being "permanently associated" with a host controller describes a port being wired directly to a specific host controller. In other words, the port does not have the capability to be controlled by another host controller of the same protocol in the computer system due to the direct controller-to-port interconnect wiring scheme. Although each interconnect may comprise multiple electrical and or optical lines that pass data, address, control, and clocking signals back and forth between the host controller and the port, the entire interconnect per controller-port pairing is represented by a single line in FIG. 1.

In a current computer system, if at least one port permanently associated with a host controller has a device attached (e.g., a USB printer in the case of a USB host controller), the host controller is required to be fully powered on and operational. Alternatively, if a host controller had no devices attached to any of the ports, and thus the ports were all idle, a computer system that had advanced power savings features may be capable of powering down portions or all of the idle host controller. These power savings features may include clock gating or power gating portions or all of the affected host controller. The specific power savings features may alternatively include any other power savings process that computer systems employ today. The term "powered down" refers to one or more of these power savings features being implemented on an idle host controller. When the host controller is powered down, the computer system consumes less total energy, which saves on energy costs as well as battery life in portable computer systems and thermal solution requirements in any computer system. Whereas, the term "powered up" refers to the opposite effect of disengaging the one or more power savings features that limit the power consumption of the host controller.

Because ports are permanently associated with specific host controllers, a current computer system may have as little as two ports active and still require two host controllers to be fully operational. For example, in FIG. 1, if a first device is attached to P0 and a second device is attached to P6, both host controller 0 and host controller 1 must remain powered up to allow the devices to operate. Specifically in the example illustrated in FIG. 1, the ports that are active are shown in pure white and the ports that are inactive are shown cross-hatched. Furthermore, the interconnect lines running from the host controller to each inactive port are dotted to show that they are not being currently utilized. Therefore, P0, P2, and P5 are active and, thus, host controller 0 is powered on and P6, P9, and P11 are active and, thus, host controller 1 is powered on.

The term "associate" and its derivatives, when referred to in the context of associating a port with a host controller, refers to linking a port with a host controller communicatively so they can communicate/talk with each other in an operating state. This process can be performed through device enumeration or in other ways that are available when devices are plugged into ports. On the other hand, when a device is unplugged from a port or deactivated in a port, the port becomes inactive because the device is no longer communicating with the host controller. Thus, the host controller no longer requires a link to that particular port and the port can essentially be "disassociated" with the host controller.

The state of the computer system in FIG. 1 is inefficient from a power consumption point of view because only six ports are active which would allow one of the two host controllers to power down if all six active ports were associated with a single host controller. To accomplish this, active ports P6, P9, and P11 would need to change their association from host controller 1 to host controller 0 or active ports P0, P2, and P5 would need to change their association from host controller 0 to host controller 1. With the permanent association scheme in the current computer system in FIG. 1 this is not possible.

Figure 2:
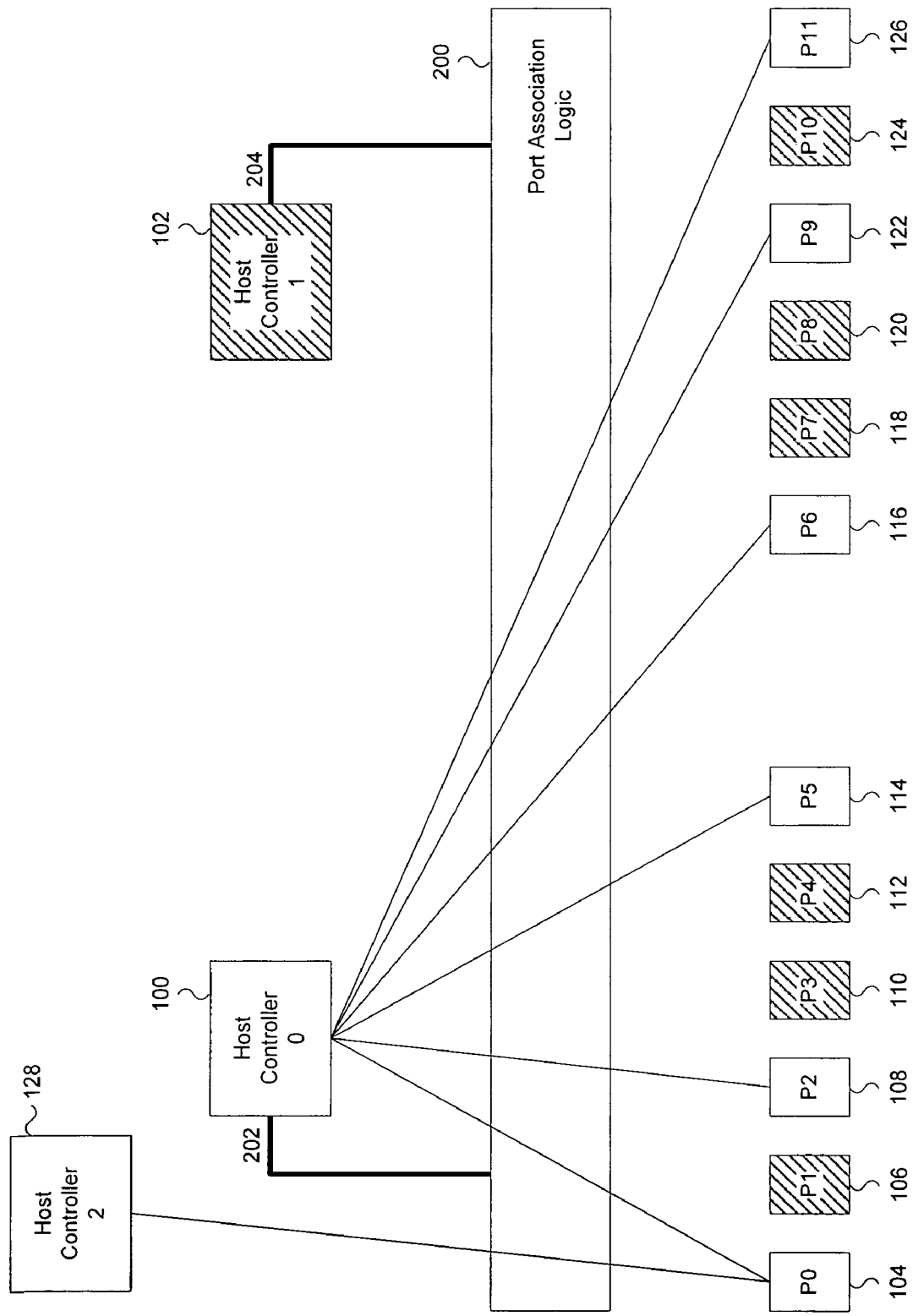
FIG. 2 describes an embodiment of a computer system with a dynamic port association scheme.

FIG. 2 describes an embodiment of a computer system with a dynamic port association scheme. The same ports active in FIG. 1 are shown as active in FIG. 2. Though now host controller 0 can dynamically be associated with any of the 12 ports (P0-P11) located in the computer system. So host controller 0 can control the six active ports (P0, P2, P5, P6, P9, and P11) and, therefore, host controller 1 has the opportunity to power down (host controller 1 is shown powered down by the cross-hatch).

Figure 6:
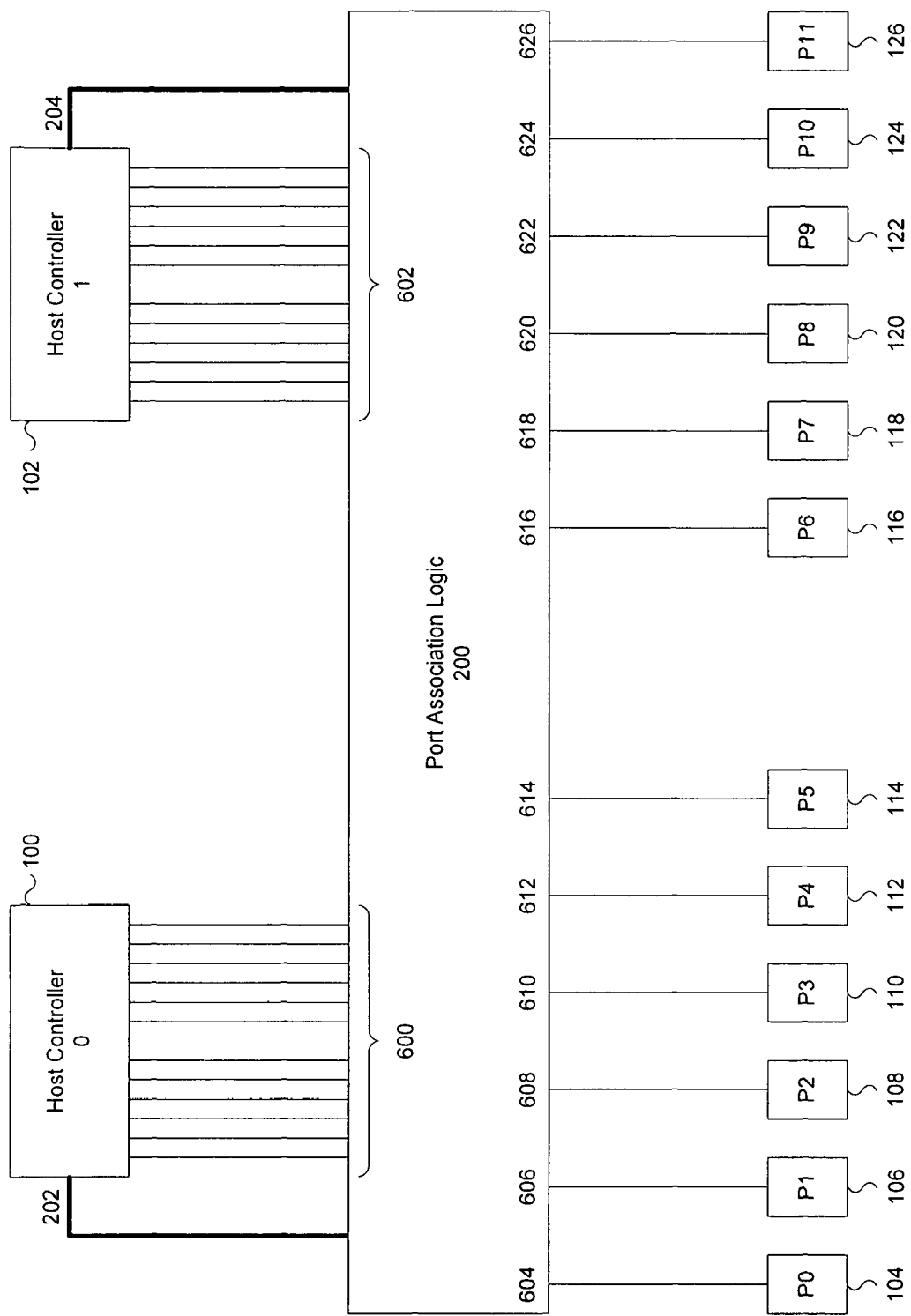
FIG. 6 describes an embodiment of the dynamic port association interconnect wiring layout within a computer system.
Figure 7:
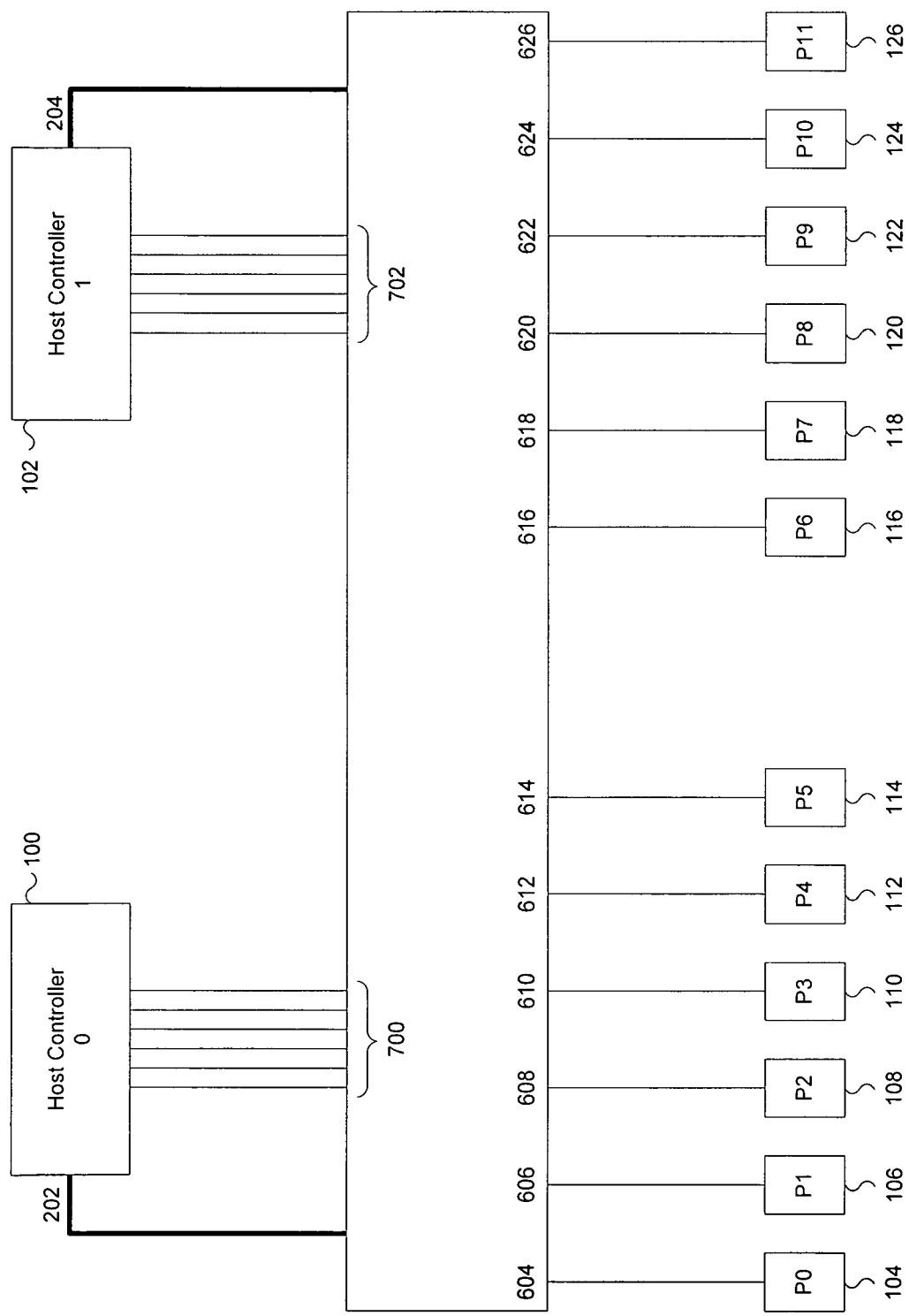
FIG. 7 describes an alternative embodiment of the dynamic port association interconnect wiring layout within a computer system.

Port association logic 200 is shown in FIG. 2 as an intermediary between host controller 0 and the associated ports. Port association logic 200 has the capability to dynamically associate (i.e., route) a port with any given host controller. All interconnects passing between each host controller and the ports pass through port association logic, which acts like a demultiplexer/multiplexer that allows each host controller to have an interconnect path to every port in the computer system. Embodiments of the specific wiring implementation between the host controllers, the port association logic, and the ports are shown in FIGS. 6 and 7.

In different embodiments, port association logic 200 may be a discrete chip within the computer system, it may be integrated into an I/O Complex that includes integrated host controllers, or it may be implemented into software or microcode that a microcontroller utilizes to perform the associations. The software or microcode may be stored within a device in the computer system.

In some embodiments, links 202 and 204 exist to allow the port association logic 200 to inform each host controller when it is required to power up and when it is allowed to power down.

Figure 3:
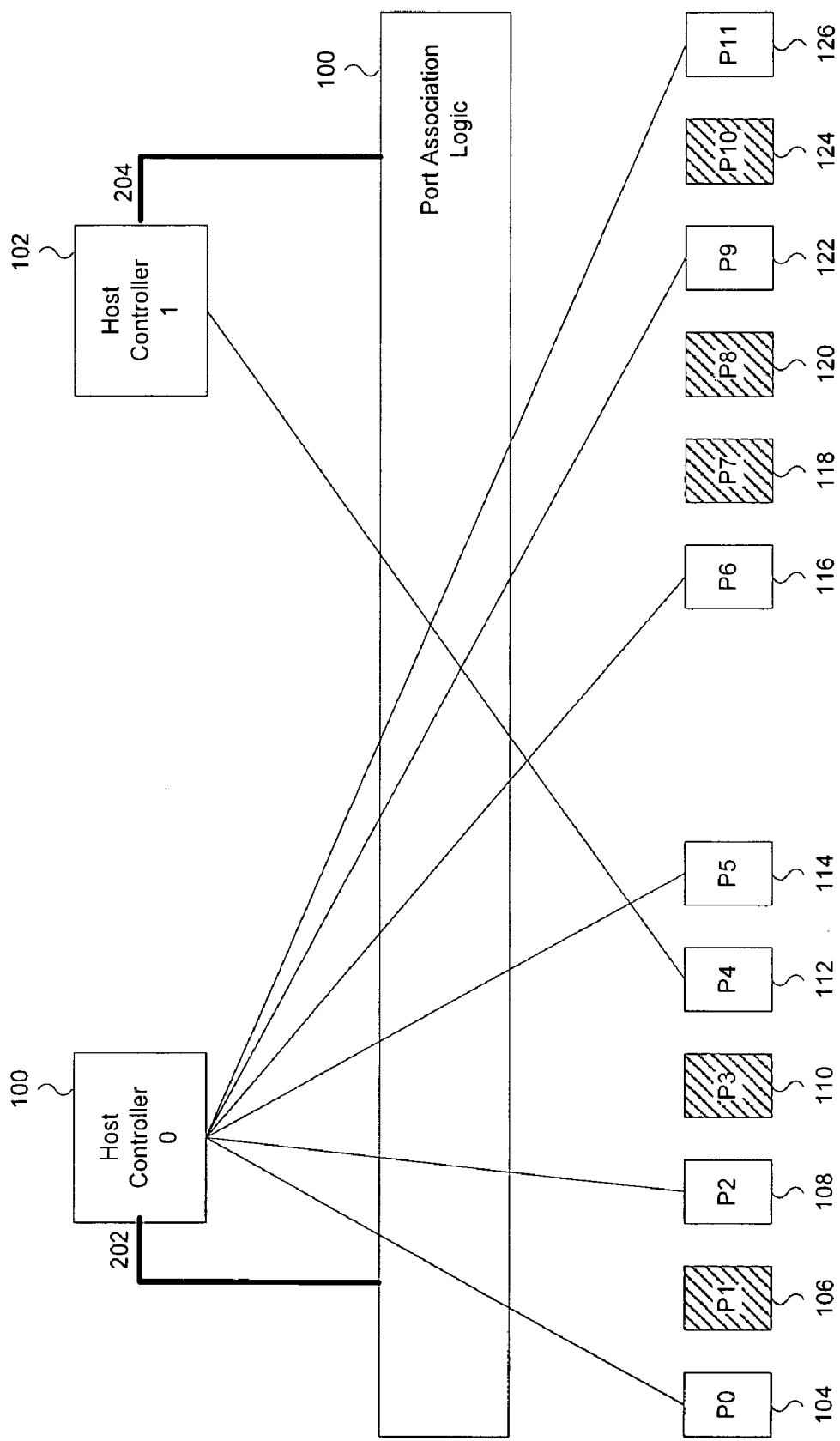
FIG. 3 describes an embodiment of a computer system that adds an active port using a dynamic port association scheme.

FIG. 3 describes an embodiment of a computer system that adds an active port using a dynamic port association scheme. As stated above, the embodiments shown in FIGS. 1 and 2 describe host controller 0 and host controller 1 as being able to control a maximum capacity of six ports each. In FIG. 2, host controller 0 is controlling a total of six ports. FIG. 3 describes the case that begins with the situation in FIG. 2 and then a newly active port is added to the list of active ports. "Newly active" refers to a port that was idle and then an event causes the port to wake up and leave the idle state. For example, a person plugging a device into an external port would cause the port to become newly active.

In other cases that are not shown in FIG. 3, if there are less than six ports currently active and a newly active port is added, the port association logic 200 can associate the newly active port with the same host controller that is already powered on and operational. Though, in the specific case shown in FIG. 3, host controller 0 is operating at maximum capacity with six currently active ports and a seventh port is added. In this case, host controller 1 is informed by the port association logic 200 to wake up and enter into a fully operational state because port P4 has become newly active. Thus, host controller 1 wakes up and then the port association logic 200 dynamically associates P4 with host controller 1.

The process in the operating system for determining when a device is plugged into a port when the computer is operational (termed "hot plugging") takes on the order of seconds normally before the device is operational. Internally, the process of bringing a host controller out of a powered down state (whether clock gated, power gated, etc.) takes on the order of microseconds or milliseconds at worst. Thus, in many embodiments, the delay in powering up a host controller that was powered down would be hidden by the larger operating system delay required to get a hot plugged device into an operational state.

Figure 4:
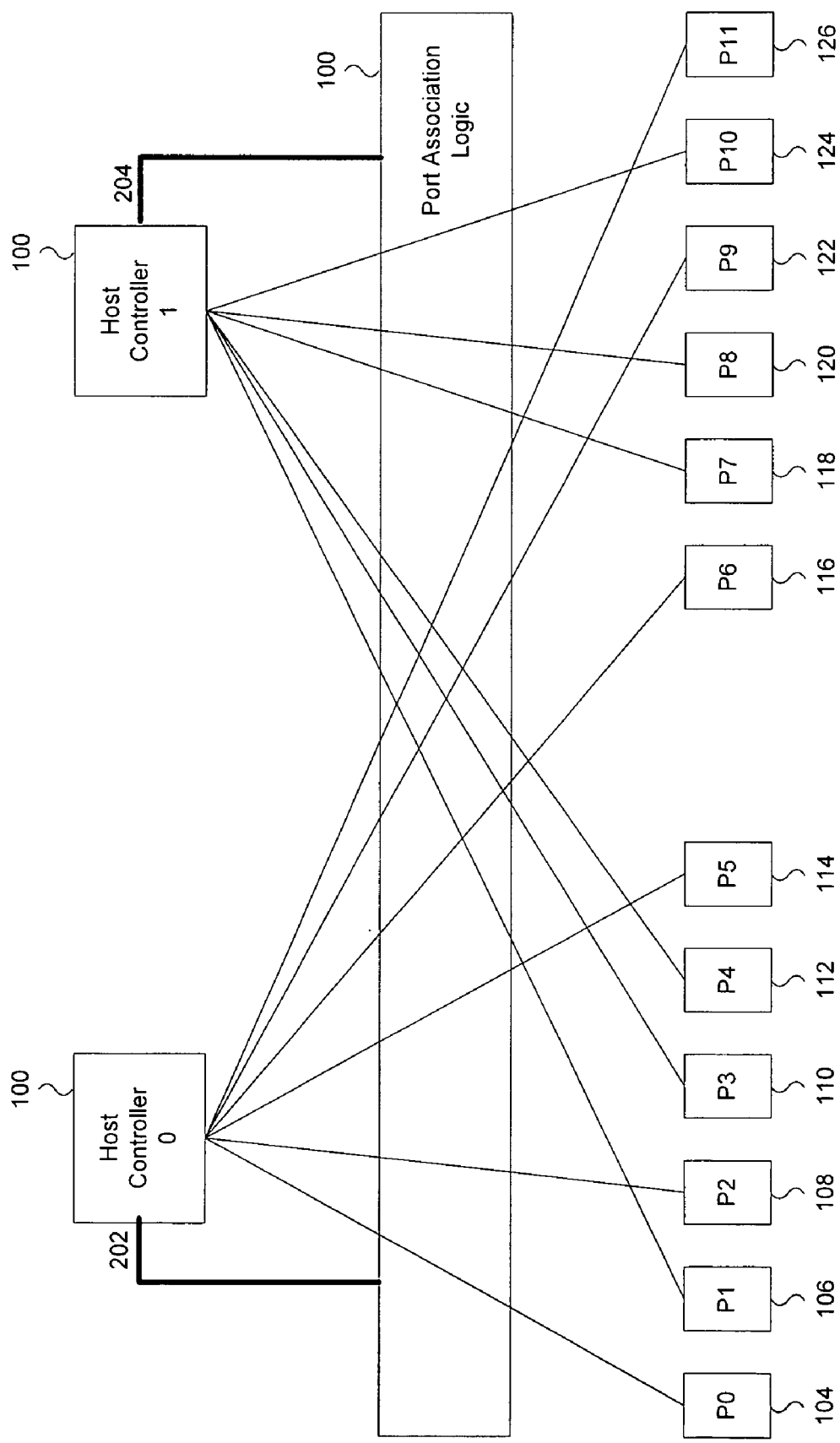
FIG. 4 describes an embodiment of a computer system that adds active ports to the maximum allowable number of ports using a dynamic port association scheme.

FIG. 4 describes an embodiment of a computer system that adds active ports to the maximum allowable number of ports using a dynamic port association scheme. In FIG. 4, the rest of the inactive ports shown in FIG. 3 become active and are associated with host controller 1. Specifically ports P1, P3, P4, P7, P8, and P10 are associated with host controller 1.

Although the current scenario shown in FIG. 4 was dictated by the first six ports that became active, this does not mean that ports P0, P2, P5, P6, P9, and P11 are always to be associated with host controller 0 or that ports P1, P3, P4, P7, P8, and P10 are always to be associated with host controller 1. For example, returning to FIG. 3, where seven ports are active, if port P6 subsequently became inactive, the port association logic 200 would realize that once again only six ports were active and, as a result, in many embodiments the port association logic 200 would transfer port P4's association from host controller 1 to host controller 0. After performing the association transfer, the port association logic 200 would be again capable of powering down host controller 1.

Figure 5:
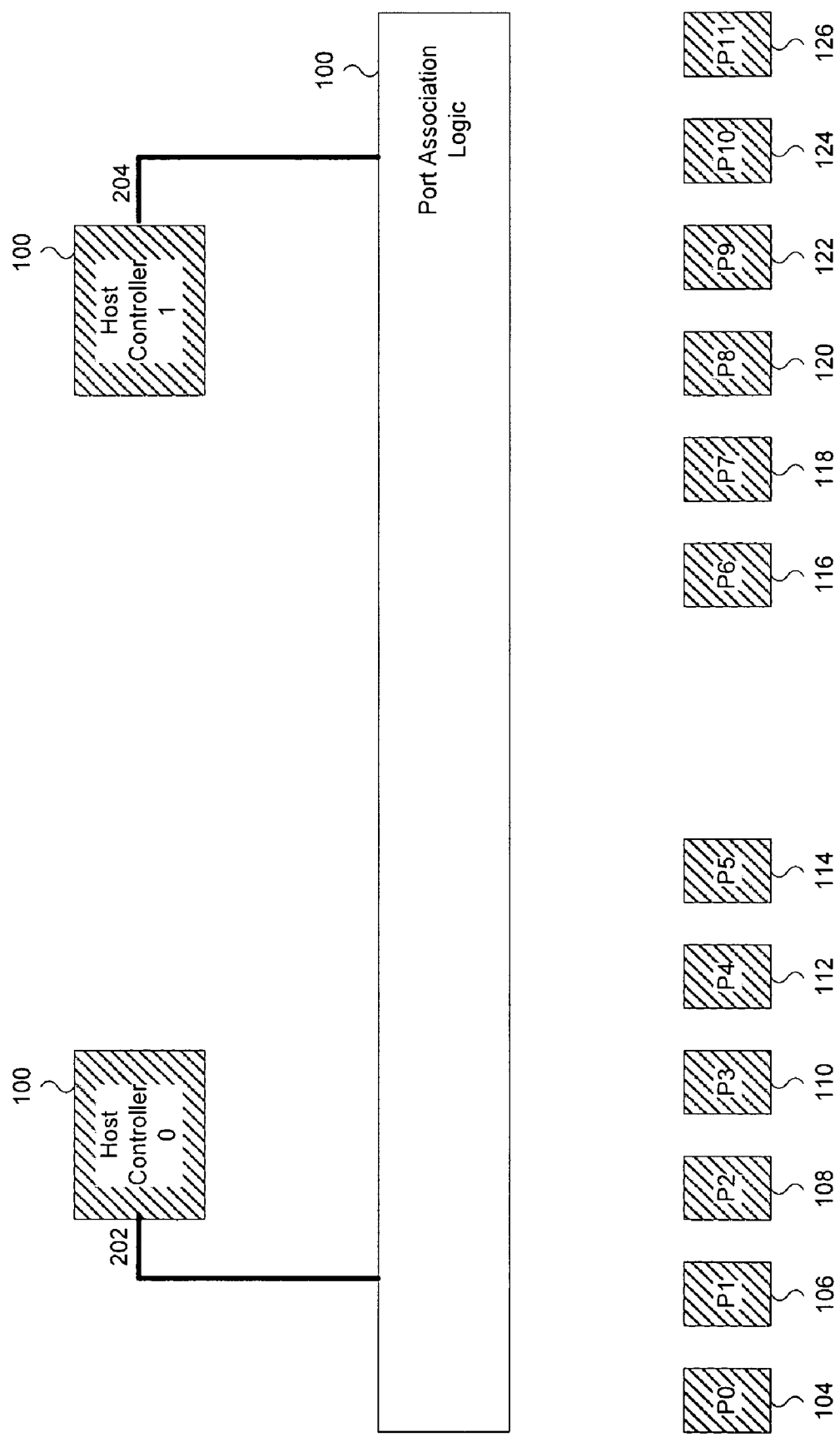
FIG. 5 describes an embodiment of a computer system that removes all active ports using a dynamic port association scheme.

FIG. 5 describes an embodiment of a computer system that removes all active ports using a dynamic port association scheme. At the opposite end of the spectrum, FIG. 5 illustrates where no ports are currently active. In this scenario, both host controller 0 and host controller 1 would be able to power down.

FIG. 6 describes an embodiment of the dynamic port association interconnect wiring layout within a computer system. In this embodiment, there are 12 ports (P0-P11) present in the computer system. Each of the 12 ports has an interconnect (604-626) that couples the port to the port association logic 200. P0 is coupled through interconnect 604, P1 is coupled through interconnect 606, and so on. Additionally, in this embodiment, each host controller has 12 interconnects (item 600 for host controller 0 and item 602 for host controller 1) between itself and the port association logic 200. Thus, the port association logic 200 can dynamically match a port (and associated interconnect coming from the port) with a host controller using one of the 12 specific interconnects coupling the host controller with the port association logic 200.

FIG. 7 describes an alternative embodiment of the dynamic port association interconnect wiring layout within a computer system. In this embodiment, there are again 12 ports (P0-P11) present in the computer system. Each of the 12 ports has an interconnect (604-626) that couples the port to the port association logic 200. Additionally, in this embodiment, each host controller has six interconnects (item 700 for host controller 0 and item 702 for host controller 1) between itself and the port association logic 200. Thus, the port association logic 200 can dynamically match a port (and associated interconnect coming from the port) with a host controller using one of the six specific interconnects coupling the host controller with the port association logic 200. The number of interconnects coupling each host controller with the port association logic 200 is limited to six because each host controller can only control six ports. Thus, at any given time, only six interconnects would be needed and they can each be routed (i.e. associated) with a specific one of the 12 ports.

Figure 8:
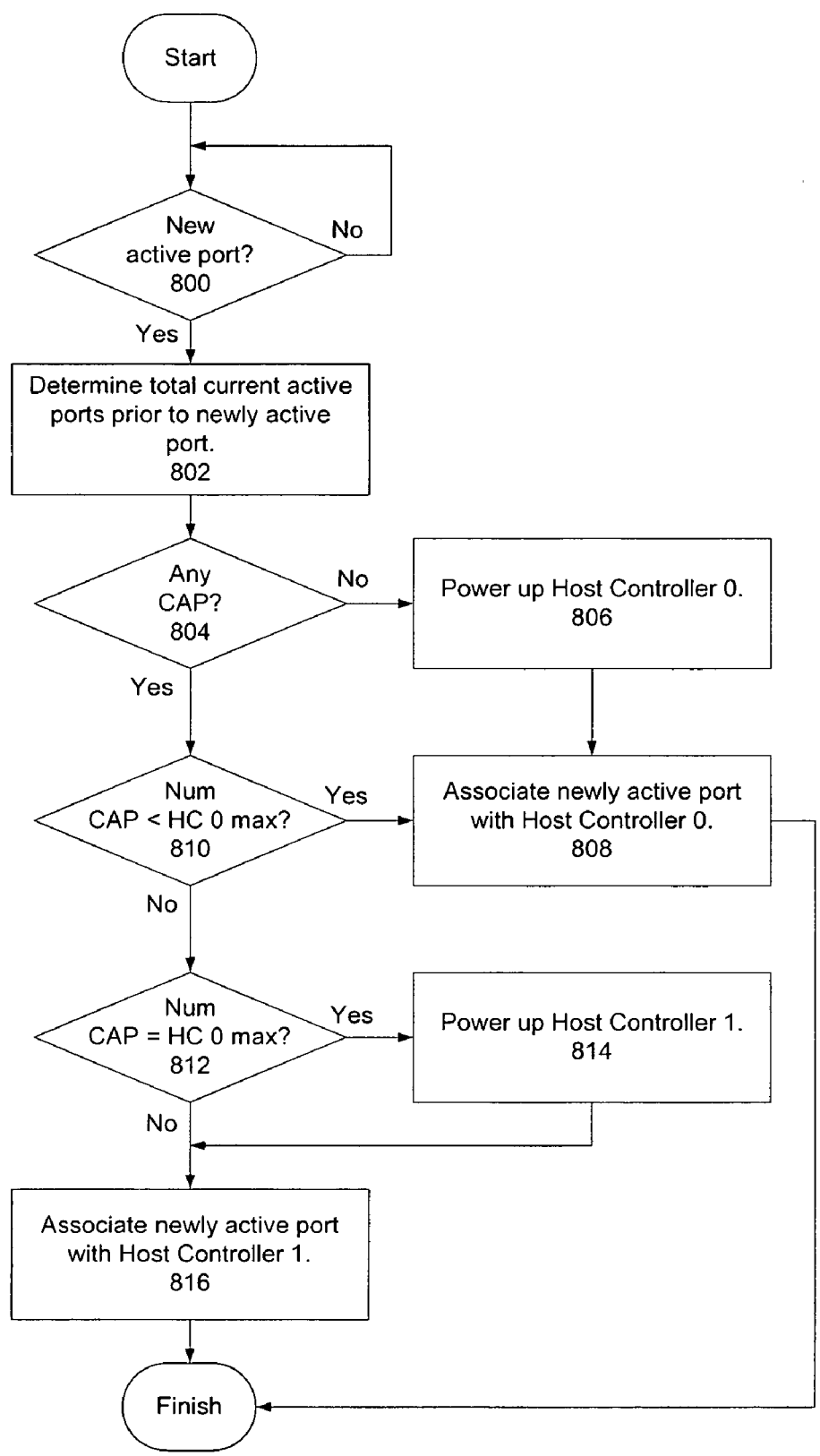
FIG. 8 is a flow diagram of an embodiment of a process to dynamically associate a newly active port with a host controller for computer system power efficiency.

FIG. 8 is a flow diagram of an embodiment of a process to dynamically associate a newly active port with a host controller for computer system power efficiency. The process is performed by processing logic which may be hardware, software, or a combination of both. Turning now to FIG. 8, the process starts by processing logic determining whether there is a newly active port in the computer system (processing block 800). If there is not a newly active port, processing logic loops back and continues to attempt to determine if a newly active port has been activated in the computer system.

When processing logic does determine that there is a newly active port, then it determines the total current active ports in the computer system (processing block 802). This particularly determines the total currently active ports prior to when the newly active port is activated. Then processing logic utilizes that result to check if there are any currently active ports (CAP) in the computer system (processing block 804).

If there are no currently active ports, then processing logic powers up host controller 0 (i.e. the first host controller in the system) (processing block 806). Once host controller 0 is powered up, then processing logic associates the newly active port with host controller 0 (processing block 808) and the process is finished.

Returning to block 804, if there are currently active ports already operational, then processing logic determines if the number of currently active ports is less than the host controller 0 maximum number of associated ports (processing block 810). If the number is less than the host controller 0 maximum capacity, then processing logic associates the newly active port with host controller 0 (processing block 808) and the process is finished.

Returning to block 810, if the number of currently active ports is not less than the host controller 0 maximum capacity, then processing logic determines whether the number of currently active ports is equal to the host controller 0 maximum number of associated ports (processing block 812). If the number is equal to the host controller 0 maximum capacity, then processing logic powers up host controller 1 (i.e. the second host controller in the system) (processing block 814). Then, once host controller 1 is powered up, processing logic associates the newly active port with host controller 1 (processing block 816) and the process is finished.

Returning to block 812, if the number of currently active ports is not equal to the host controller 0 maximum capacity then it can be inferred that the number of currently active ports is greater than the host controller 1 maximum capacity. This means that host controller 1 must already be operational. Thus, processing logic associates the newly active port with host controller 1 (processing block 816) and the process is finished.

Although this process was shown as it relates to specifically a two host controller environment, it can be expanded to accommodate any number of host controllers greater than two with certain obvious modifications in the logic of the process.

Figure 9:
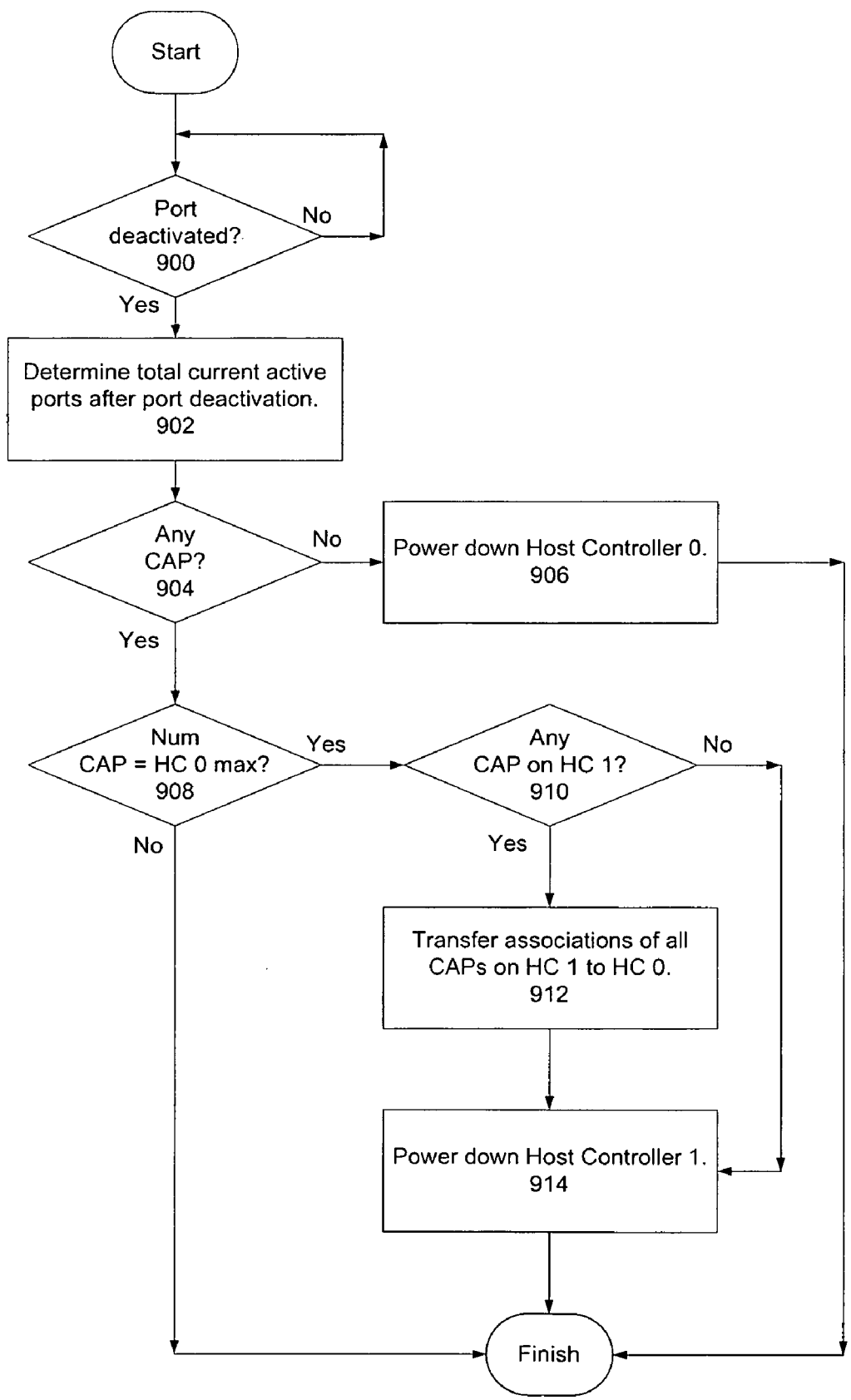
FIG. 9 is a flow diagram of an embodiment of a process deactivate a port and dynamically rearrange the remaining port associations with a host controller for computer system power efficiency.

FIG. 9 is a flow diagram of an embodiment of a process deactivate a port and dynamically rearrange the remaining port associations with a host controller for computer system power efficiency. The process is performed by processing logic which may be hardware, software, or a combination of both. Turning now to FIG. 9, the process starts by processing logic determining whether a port has been deactivated in the computer system (processing block 900). A port may be deactivated for a number of reasons, such as when a person unplugs a device from the port. If a port has not been deactivated, processing logic loops back and continues to attempt to determine if a port has been deactivated in the computer system.

When processing logic does determine that a port has been deactivated, then it determines the total current active ports in the computer system after the port deactivation takes place (processing block 902). Then processing logic utilizes that result to check if there are any currently active ports (CAP) in the computer system (processing block 904).

If there are no currently active ports, then processing logic powers down host controller 0 (i.e. the first host controller in the system) (processing block 906). Once host controller 0 is powered down the process is finished.

Returning to block 904, if there are any currently active ports still operational, then processing logic determines if the number of currently active ports is equal to the host controller 0 maximum number of associated ports (processing block 908). If the number is not equal to the host controller 0 maximum capacity, then processing logic infers that there are either more than or less than the host controller 0 maximum number of associated ports. In this case, no host controller power modification is necessary since the host controller(s) currently powered up must remained powered up to allow the currently utilized ports on the computer system to all remain operational. Thus, when the number of currently active ports is not equal to the host controller 0 maximum capacity, the process is finished.

Alternatively, if the number of currently active ports equal to the host controller 0 maximum capacity, then processing logic determines whether there are any currently active ports associated with host controller 1 (processing block 910). If there are no ports currently associated with host controller 1, then processing logic powers down host controller 1 (processing block 914) and the process is finished.

Returning to block 910, if there is at least one port associated with host controller 1, then processing logic transfers the associations of all currently active ports currently associated with host controller 1 to host controller 0 (processing block 912). Again, as discussed above in regard to FIG. 3 where seven ports are active, if port P6 subsequently becomes inactive, the port association logic 200 would realize that once again only six ports were active and, as a result, in many embodiments the port association logic 200 would transfer port P4's association from host controller 1 to host controller 0.

After the associations have all been transferred to host controller 0, host controller 1 no longer has any active ports associated with it. Therefore, processing logic can then power down host controller 1 (processing block 914) and the process is finished.

Again, although this process was shown as it relates to specifically a two host controller environment, it can be expanded to accommodate any number of host controllers greater than two with certain obvious modifications in the logic of the process.

Thus, embodiments of a method, device, system, and computer readable medium for power optimized dynamic port association are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
    dynamically associating a newly active port in a computer system with a first host controller when a total number of currently active ports in the computer system is less than a maximum capacity number of ports for the first host controller;
    dynamically associating the newly active port in the computer system with a second host controller when the total number of currently active ports in the computer system is greater than or equal to the maximum capacity number of ports for the first host controller; and
    preventing the second host controller from powering to an operating state when the total number of currently active ports in the computer system is less than or equal to the maximum capacity number of ports for the first host controller,
    wherein each port, the first host controller, and second host controller all utilize the same protocol.

2. The method of claim 1, further comprising:
    allowing the second host controller to power up to an operating state when the first host controller is currently operating at the maximum capacity number of ports for the first host controller, the second host controller is currently in a powered down state, and an additional port in the computer system becomes active and requires association with a host controller.

3. The method of claim 2, further comprising:
    dynamically associating the additional port with the second host controller once the second host controller is operational.

4. The method of claim 3, further comprising:
    changing an association of one or more of the currently active ports in the computer system from being associated with the second host controller to being associated with the first host controller when the total number of currently active ports is less than or equal to the maximum capacity number of ports for the first host controller and the one or more currently active ports remain associated with the second host controller.

5. The method of claim 1, further comprising:
    powering down the second host controller after a newly inactive port is disassociated with the second host controller and no other active ports in the computer system are associated with the second host controller.

6. The method of claim 1, wherein the protocol is a Universal Serial Bus protocol.

7. A device, comprising:
    port association logic in a computer system to:
        dynamically associate a newly active port in the computer system with a first host controller when a total number of currently active ports in the computer system is less than a maximum capacity number of ports for the first host controller;
        dynamically associate the newly active port in the computer system with a second host controller when the total number of currently active ports in the computer system is greater than or equal to the maximum capacity number of ports for the first host controller; and
        prevent the second host controller from powering to an operating state when the total number of currently active ports in the computer system is less than or equal to the maximum capacity number of ports for the first host controller,
    wherein each port, the first host controller, and second host controller all utilize the same protocol.

8. The device of claim 7, wherein the port association logic is further operable to:
    allow the second host controller to power up to an operating state when the first host controller is currently operating at the maximum capacity number of ports for the first host controller, the second host controller is currently in a powered down state, and an additional port in the computer system becomes active and requires association with a host controller.

9. The device of claim 8, wherein the port association logic is further operable to:
    dynamically associate the additional port with the second host controller once the second host controller is operational.

10. The device of claim 8, wherein the port association logic is further operable to:
    change an association of one or more of the currently active ports in the computer system from being associated with the second host controller to being associated with the first host controller when the total number of currently active ports is less than or equal to the maximum capacity number of ports for the first host controller and the one or more currently active ports remain associated with the second host controller.

11. The device of claim 7, wherein the port association logic is further operable to:
    cause the second host controller to power down after one or more ports are disassociated with the second host controller and no other active ports in the computer system are associated with the second host controller.

12. The device of claim 7, wherein the protocol is a Universal Serial Bus protocol.

13. A computer system, comprising:
a first Universal Serial Bus host controller;
a second Universal Serial Bus host controller; and
a port association logic device to:
dynamically associate a newly active port in the computer system with the first host controller when a total number of currently active ports in the computer system is less than a maximum capacity number of ports for the first host controller;
dynamically associate the newly active port in the computer system with a second host controller when the total number of currently active ports in the computer system is greater than or equal to the maximum capacity number of ports for the first host controller; and
prevent the second host controller from powering to an operating state when the total number of currently active ports in the computer system is less than or equal to the maximum capacity number of ports for the first host controller.

14. The computer system of claim 13, wherein the port association logic is further operable to:
allow the second host controller to power up to an operating state when the first host controller is currently operating at the maximum capacity number of ports for the first host controller, the second host controller is currently in a powered down state, and an additional port in the computer system becomes active and requires association with a host controller.

15. The computer system of claim 14, wherein the port association logic is further operable to:
dynamically associate the additional port with the second host controller once the second host controller is operational.

16. The computer system of claim 14, wherein the port association logic is further operable to:
change an association of one or more of the currently active ports in the computer system from being associated with the second host controller to being associated with the first host controller when the total number of currently active ports is less than or equal to the maximum capacity number of ports for the first host controller and the one or more currently active ports remain associated with the second host controller.

17. The computer system of claim 13, wherein the port association logic is further operable to:
cause the second host controller to power down after one or more ports are disassociated with the second host controller and no other active ports in the computer system are associated with the second host controller.

18. The computer system of claim 13, wherein the port association logic is further operable to:
prevent the second host controller from powering to an operating state by power-gating the second host controller.

19. The computer system of claim 13, wherein the port association logic is further operable to:
prevent the second host controller from powering to an operating state by clock-gating the second host controller.

20. A computer readable medium having embodied thereon instructions, which when executed by a computer, results in the computer performing a method comprising:
dynamically associating a newly active port in a computer system with a first host controller when a total number of currently active ports in the computer system is less than a maximum capacity number of ports for the first host controller;
dynamically associating the newly active port in the computer system with a second host controller when the total number of currently active ports in the computer system is greater than or equal to the maximum capacity number of ports for the first host controller; and
preventing the second host controller from powering to an operating state when the total number of currently active ports in the computer system is less than or equal to the maximum capacity number of ports for the first host controller,
wherein each port, the first host controller, and second host controller all utilize the same protocol.

21. The computer readable medium of claim 20, further comprising:
allowing the second host controller to power up to an operating state when the first host controller is currently operating at the maximum capacity number of ports for the first host controller, the second host controller is currently in a powered down state, and an additional port in the computer system becomes active and requires association with a host controller.

* * * * *